March 31, 1959   A. E. GIMSON   2,879,781
CONTROL APPARATUS
Filed Nov. 18, 1955   2 Sheets-Sheet 2

INVENTOR.
ALVIN E. GIMSON
BY Henry L. Hanson
ATTORNEY.

United States Patent Office 2,879,781
Patented Mar. 31, 1959

2,879,781
CONTROL APPARATUS

Alvin E. Gimson, Philadelphia, Pa., assignor to Minneapolis-Honeywell Regulator Company, Minneapolis, Minn., a corporation of Delaware Application November 18, 1955, Serial No. 547,684

6 Claims. (Cl. 137—85)

A general object of the present invention is to provide a new and improved fluid actuated positioner which is adapted for positioning an output member such as a valve stem. More specifically, the present invention is concerned with an improved fluid pressure actuated positioner which is adapted to receive an input control signal from an external electrical signal source and which includes means for producing a regulatable fluid pressure which acts upon a pressure responsive output member.

Hydraulic or fluid actuators are widely used for producing relatively high output forces in accordance with some minute intput control signal. The input control signal usually operates through some type of pilot assembly to produce an amplified fluid pressure signal which may be applied to an output piston or the like. The output piston, in turn, may be used to position some element to regulate a process variable or produce some other desired control action.

For optimum performance in certain control applications it is essential that the variable sensing elements be capable of a higher speed of response, and it is equally essential that the output process control element be capable of a corresponding high speed of response. The present invention is concerned with improving the speed of response of the output element of the control configuration by an improved form of electric to hydraulic signal converter which is adapted to cooperate with a novel pressure to motion converter.

In one form of the invention, the electric to pressure converter cooperates with a second hydraulic pilot valve amplifier which is characterized by its high speed of response and its ability to lock the final output element in a fixed position upon a supply pressure failure.

It is accordingly a more specific object of the present invention to provide an improved electro-hydraulic actuator incorporating a signal converter which will produce a high speed of response of the output element of the converter.

Still another more specific object of the present invention is to provide an improved hydraulic fluid actuator incorporating a pilot valve amplifier assembly which incorporates means for locking the final output of the actuator in a fixed position upon a failure of the supply pressure for the actuator.

A further more specific object of the present invention is to provide an improved pilot valve apparatus which incorporates a slidable fluid regulating element which is adapted to regulate the flow of fluid through ports in the pilot valve assembly and which further incorporates means for moving the movable portion to a port closing position upon a failure in the supply pressure.

A still further object of the present invention is to provide an improved output actuator for a hydraulic positioner comprising a pair of opposed resilient wall chambers having an output member connected to the opposite end walls of the opposed chambers with means for differentially applying pressure to the chambers so as to effect a motion of the output member in accordance with the differential pressures in said chambers.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Figure 1:
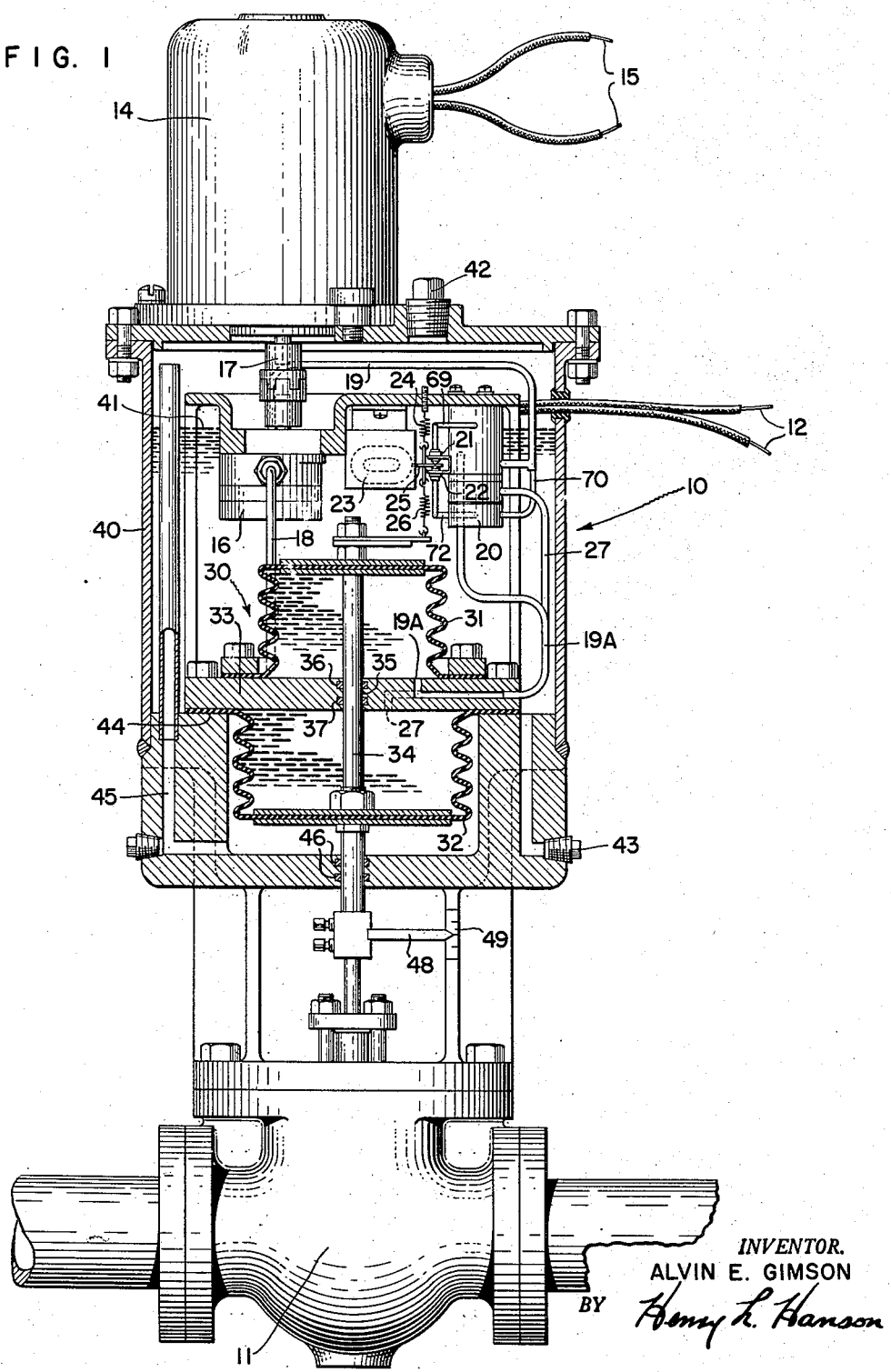
Fig. 1 is a diagrammatic illustration of the present invention applied to a hydraulic valve actuator.

Referring first to Fig. 1, there is shown a valve actuator mechanism 10 which is adapted to control the flow of fluid through a valving member 11. The valve actuator 10 is controlled by an electrical signal supplied by way of the input leads 12. The electrical signal is operative, as explained hereinafter, to produce a control effect as required to regulate the opening of the valve 11 in accordance with the applied signal on the input electrical leads 12.

Actuator 10 comprises a continuously driven electrical motor 14 which is connected to a power supply source by means of input leads 15. The motor 14 is connected to drive a gear pump assembly 16 by way of a driving shaft mechanism 17.

The pump 16 has an inlet conduit 18 and an outlet conduit 19. Contained within the pump housing 16 is a suitable pressure regulator, or relief valve, not shown, which limits the peak pressure on the output of the pump to a desired value which may be, for example, 250 p.s.i. The output of the conduit 19 feeds into a pilot valve assembly 20, which assembly has a pair of output nozzles 21 and 22 which are adapted to regulate the control pressures within the pilot valve 20. For regulating the pressures within the pilot valve 20 there is provided an electric to force transducer 23. This latter transducer may well take the form of the electric to force transducer disclosed in the co-pending application of Philip E. Shafer, entitled "Electrical Device" bearing Serial No. 433,505 and filed June 1, 1954, now Patent No. 2,847,619, dated Aug. 12, 1958. A zeroing spring 24 is shown connected to the output baffle 25 of the transducer 23. Further, a force balancing spring 26 is shown connected to the baffle 25.

The output of the pilot valve assembly 20 is by way of a conduit 27 which connects to the output pressure motor or pressure to motion converter 30. A further output conduit 19A connects the pilot valve assembly to converter 30.

The output motor comprises a bellows member 31 and a further bellows member 32 which are connected to be operative in the opposite directions with respect to a plate 33. The common open ends of the bellows members 31 and 32 are rigidly fastened to the plate 33. The bellows 31 is in a direct communication with the conduit 19A while the bellows 32 is in direct communication with the conduit 27. The ends of the bellows units 31 and 32, which are free to move, are fastened together by an output shaft 34, the latter of which passes through the plate 33 at 35. The opening through the plate 33 is effectively sealed by a pair of sealing O-rings 36 and 37.

Surrounding the assembly, thus far described, is an external casing 40 which is adapted to be filled with oil up to a level slightly above the level of the pump 16 as identified by the oil level line 41. The casing 40 may be filled by way of the filling plug 42 and drained by way of the drain plug 43. The oil in the housing 40 is kept from entering the space below the bellows 32 due to the fact that bellows 32, when clamped into position at 44 forms a fluid tight seal which prevents the oil above the barrier plate 33 from passing below the bellows 32. The space below the bellows 32 is vented to a space above the oil level in the housing 40 by means of the vent passage 45.

In the event there should be any leakage of oil into the space below the bellows 32, this oil may be retained in the enclosure by the O-rings seals 46 which surround the shaft 34 where it passes through the housing 40. The shaft 34 may conveniently carry an indicating pointer 48 which cooperates with the scale 49 to indicate the true position of the valve member 11, or the true position of the shaft or output member 34.

Considering the operation of Fig. 1, it should first be noted that the motor 14 will be continuously operated and will be driving the pump 16 to produce in the output conduit 19 a hydraulic fluid pressure of a substantially fixed magnitude, for example, 250 p.s.i. This pressure signal will be applied to the input of the pilot valve assembly 20 and to the bellows unit 31 so that the bellows unit will have effectively a constant pressure signal acting against the inside thereof tending to move the rod 34 in an upward direction. The pressure signal in the output conduit 27 of the pilot valve assembly 20 will be dependent upon the relative position of the baffle 25 with respect to the nozzles 21 and 22. This position of the baffle 25 with respect to the nozzles 21 and 22 will in turn be regulated by the magnitude of the input current to the electric to force transducer 23. The force from the transducer 23 is modified by the forces produced by the zeroing spring 24 and the feedback spring 26, the latter of which is directly connected to the output member 34. It is assumed that under a condition of balance in the overall actuator that the output hydraulic pressure from the pilot valve assembly 20, in the conduit 27, will be one-half the pressure of the output signal of the pump 16 in conduit 19. Thus, when this signal from the conduit 27 is applied to the bellows 32, the latter having an area twice that of the bellows 31, there will be a balance of the forces acting upon the output member 34. This will mean that the output member 34 will remain in a fixed position.

Should it be desired to move the output member 34 in an upward direction, the electrical signal applied to the electric transducer 23 will be changed so as to move the baffle 25 towards the nozzle 22. This movement will cause the pressure in the conduit 27 to decrease and thereby the pressure within the bellows 32 will decrease so that there will be a resultant net upward force to move the rod 34 in an upward direction. This movement will relax the tension of the feedback spring 26 upon the baffle 25 and the baffle 25 will move to a balanced position at which time the output pressure in the conduit 27 will be approximately half the pressure in the conduit 19A so that the rod will then remain in a fixed position.

Should it be desired to move the rod 34 in a downward direction, the baffle 25 will be moved in an upward direction through the application of an input signal to the transducer 23 so that the output pressure in the conduit 27 from the pilot assembly 20 will increase and produce an increased force in the bellows 32. If this pressure in the bellows 32 is greater than half the pressure in the bellows 31, the rod 34 will move in a downward direction and as it moves, it will increase the tension in spring 26 and thereby move the baffle 25 back to a neutral or balanced position. As before, when in a balanced position, the pressure in the bellows 32 will be substantially half that within the bellows 31 and the output member 34 will remain stationary at its new position.

It will be readily apparent from the apparatus shown in Fig. 1 that there has been provided a new and improved actuator mechanism which is adapted for high speed operation with additional provisions made for readily sealing the apparatus to prevent leakage of the operating fluid from the enclosing housing.

Figure 2:
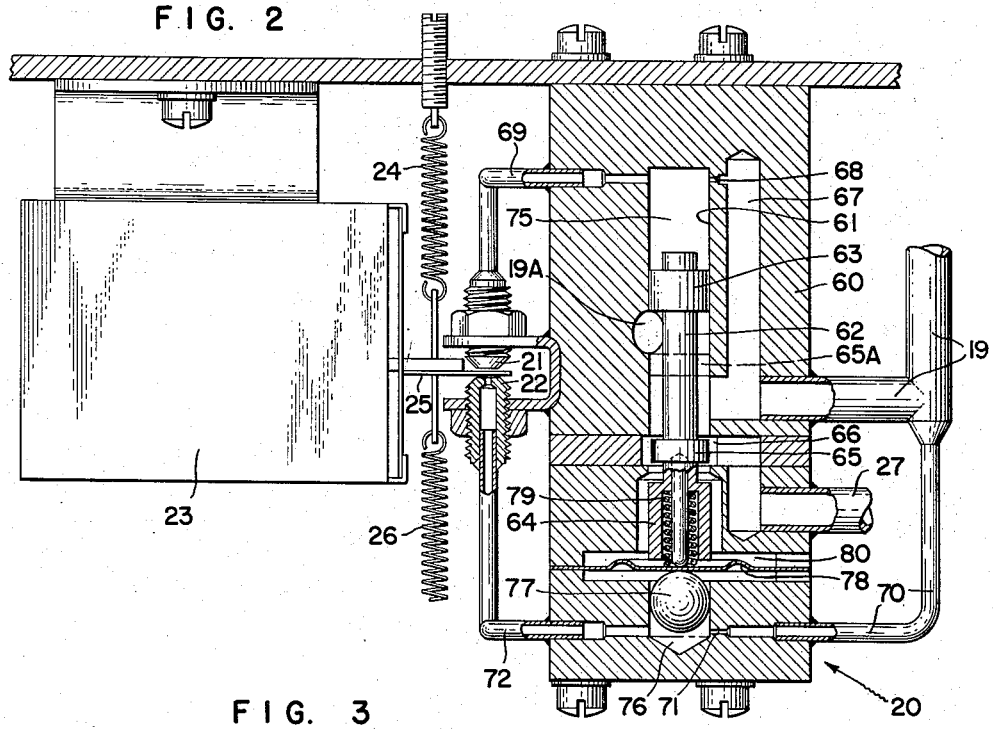
Fig. 2 shows the details of the hydraulic pilot valve which may be incorporated in the apparatus of Fig. 1.

Referring now to Fig. 2, there is here shown the pilot assembly 20 in cross sectional detail. Corresponding components between Figs. 1 and 2 carry corresponding reference characters.

The pilot valve assembly includes a valve body 60 in which is located a cylindrical bore. Positioned within this cylindrical bore is a piston valve 62 which is adapted to be slidably positioned within the bore 61. On one end of the piston valve 62 is a centering member 63 and on the other end is a further centering member 64. The member 64 is positioned in an opening drilled in the valve body of substantially the same diameter with longitudinal grooves or links extending along the sides thereof to permit the passage of oil around the sleeve. Also carried by the piston valve 62 is a port throttling member 65 which cooperates with a flow port 66 in the valve body 60.

The hydraulic fluid to the pilot assembly is supplied by way of conduit 19. This fluid flows directly to the flow port 66 past the port throttling member 65. In addition, the input supply pressure is fed to the nozzle 21 by way of a passage 67, a restriction 68, and a conduit 69. The supply pressure is also applied to the nozzle 22 by way of conduit 70, a restriction 71, and a conduit 72.

The back pressure of the nozzle 21 acts within the valve body 60 in a chamber 75 which is in communication with the upper end of the piston valve 62. The back pressure of the nozzle 22 also acts within the valve body 60 in a chamber 76. This chamber 76 communicates with the piston valve 62 by way of a spherical member 77 and a diaphragm spring 78. The member 77 may also take the form of a movable piston. The diameter of the spherical member 77 corresponds to the diameter of the end of the piston valve 62 at its opposite end. Since the diameter of the spherical member 77 and the diameter of the piston valve 62, at its opposite end are the same, the pressures in the chamber 76 and 75, when balanced, will produce no resultant force upon the piston valve 62.

Recessed within the centering member 64 is a spring 79. This spring bears against the diaphragm spring 78 and tends to urge the piston valve 62 in a direction away from the diaphragm spring 78. The exhausting port for the assembly may be around the centering member 64 and through outlet passage 80.

The operation of the pilot assembly shown in Fig. 2 is considered first with the electric to force transducer 23 moving the baffle 25 toward the nozzle 22. With the baffle 25 adjacent the nozzle 22, the pressure within the conduit 72 will increase and the pressure in the chamber 76 will increase. An increase in pressure acting upon the spherical member 77 will force the spherical member 77 in an upward direction and this in turn will act through the diaphragm spring 78 to move the piston valve 62 so that the port throttling member tends to limit the inflow of fluid from the conduit 19 through the flow port 66. At the same time, the conduit 27 will be vented to the internal pressure of the housing by the uncovering of the port 66 on the exhaust side thereof adjacent the centering member 64. This will produce a drop in the pressure in the conduit 27 which drop will be reflected through the apparatus shown in Fig. 1 and the feedback spring 26 will readjust the baffle 25 to a new position wherein a balance of the pressures will be achieved in the system.

Should the baffle 25 be moved adjacent the nozzle 21, the back pressure in the nozzle 21 will increase and will be reflected to the conduit 69 of the chamber 75 and this pressure will tend to move the piston valve 62 in a downward direction. This motion will move the port throttling member 65 to uncover a greater portion of the flow port 66 which is in communication with the supply conduit 19. The exhaust portion of the flow port 66 will be decreased in size so that the net effect will be an increased pressure in the output conduit 27. This will likewise be reflected through the system shown in Fig. 1, and the readjustment of the output rod will be reflected through the spring 26 to force balance the baffle 25.

It will be noted that as long as there is a pressure signal within the chamber 75, regardless of whether the nozzle 21 is fully opened, or is throttled by the baffle 25, the pressure signal will be effective to hold the piston valve 62, so that the spring 79 will be compressed within the recess in the centering member 64. In other words, the pressure force in chamber 75 is much greater than the spring force of the spring 79 and as long as this pressure remains in the chamber 75, the apparatus will operate in the manner as has just been explained.

Should there be a supply pressure failure, it is desired that the existing pressure conditions in the system be locked on the final output member so that the membed will stay in a fixed position. Should there be a supply pressure failure, the pressure in chamber 75 will drop and the spring 79 will force the piston valve 62 away from the diaphragm spring 78 to a position where the centering member 64 will completely cover the flow port 66 so that the hydraulic fluid in the line 27 will be effectively locked there. The port throttling member 65 will be moved in an upward direction so that the same will cooperate with the bore 61 at the dotted line position shown in 65A. The centering member 63 will still be cooperating with the bore 61 and, between the two elements 65 and 63, will have locked the supply pressure signal in conduit 19A at a fixed value. With the pressure signals being locked in the output conduit 27 and the conduit 19A, the final control element 34, Fig. 1, will remain fixed in position so that there will be no change in the control action of the valve 11.

As soon as the supply pressure is restored, the pressure within the chamber 75 will increase and will move the piston valve 62 in a downward direction to compress the spring 79 within the recess of the centering member 64. The apparatus will then be in the position shown upon the drawing at which time it is ready for further proportional amplification of the electrical signals received by the transducer 23.

It can thus be seen that in Fig. 2 there has been provided a pilot valve assembly which is adapted to fail safe upon a loss of the supply pressure and to fail safe in such a manner that the final control element will be locked in a fixed position so as to prevent any damage to the process which is under regulation or to prevent some undesired adjustment of the final control valve.

It will be readily apparent that the principle of the invention may be applied to an apparatus as in Fig. 2 wherein a single flapper-nozzle 21—25 is used to control only the pressure in chamber 75. In this event, the piston valve 62 will work against the spring action of a spring such as spring 78.

Figure 3:
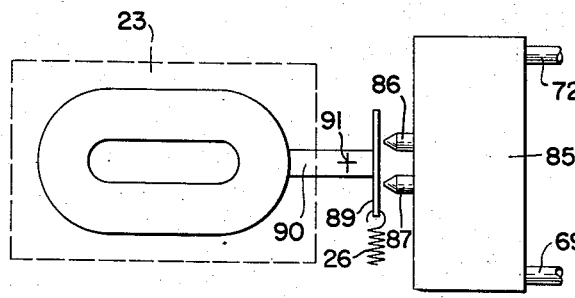
Fig. 3 shows a modified form of hydraulic pilot nozzle assembly which is adapted to be controlled by an electric force coil.

The modification shown in Fig. 3 is directed to the apparatus where the electric force transducer 23 is arranged to regulate the back pressures of the nozzle of the hydraulic system. Here there is shown a manifolding block 85 having inlet conduits 69 and 72 which may correspond to the corresponding conduits in Fig. 2. Mounted in the block 85 are a pair of nozzle 86 and 87. These two nozzles point in the same direction toward a baffle plate 89 carried by the output member 90 of the transducer 23. The member 90 is pivoted at 91 by suitable resilient pivots. The elongated central axis of the beam member 90 extends between the nozzles 86 and 87 through the pivot at 91 and the baffle 89 extends above and below the axis of the beam 90. Beam 90 has an input member in the form of a planar coil mounted on the left hand end thereof and forming part of the electric force transducer 23.

The operation of the Fig. 3 modification may be understood by noting that if the beam is moved in a clockwise direction, the upper portion of the baffle 89 moves adjacent the nozzle 86 while the lower portion of the baffle 89 moves away from the nozzle 87. Conversely, if the beam member 90 is pivoted in a counterclockwise direction, the baffle 89 moves adjacent the nozzle 87 and the baffle 89 moves away from the nozzle 86. This movement regulates the back pressures of the respective nozzles so that it is possible to achieve a very accurate regulation of the back pressures in the nozzles 86 and 87. This tranducer modification is very sensitive to current variations within the transducer 23.

Figure 4:
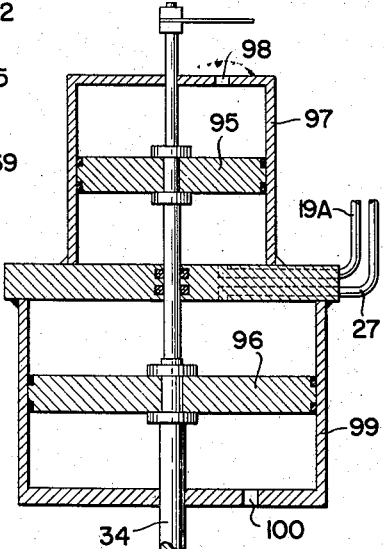
Fig. 4 shows a modified form of output pressure to motion converter which may be used in the apparatus shown in Fig. 1.

The modification of Fig. 4 shows another way in which the output actuator rod may be positioned. In this configuration, corresponding components between Figs. 1 and 4 carry corresponding reference characters. Instead of using bellows units, as in Fig. 1, this modification utilizes a pair of opposed piston elements 95 and 96. The effective area of piston 95 is approximately one-half the effective area of the piston 96. The piston 95 moves within a cylinder 97 which is vented at 98. The piston 96 moves within a cylinder 99 which is vented at 100. Both pistons 95 and 96 carry appropriate seals in their outer periphery for effectively locking the fluid acting against the pistons within the chambers closed thereby. As the pressure signal of the conduit 19A will be applied to piston 95, it will be readily apparent that this piston area need be only one-half of the size of piston 96 where the pressure signal from conduit 27 will be applied. It will be readily apparent that as the pressure signals acting upon the piston 96 are varied either above or below the one-half supply pressure value that the output rod 34 will be actuated in accordance with the movement of the piston assembly 95—96.

Figure 5:
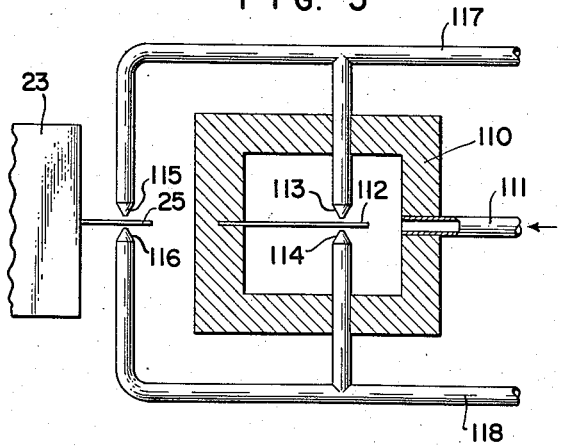
Fig. 5 shows a high gain flapper-nozzle combination which may be used with the apparatus of the aforementioned figures.

Referring now to Fig. 5, there is here shown a further modification of the pilot transducer assembly that may be used with the control valve of Fig. 1. In this arrangement, the fixed restrictions associated with the pilot assembly shown in Fig. 2 have been replaced by a variable restriction which has the overall effect of increasing the gain of the pilot assembly. In this form of the invention, the pilot assembly includes a chamber enclosing means 110 having an inlet conduit 111 which is adapted to be connected to a fluid pressure supply, and a resilient baffle member 112 which cooperates with the openings of a pair of nozzles 113 and 114. Nozzles 113 and 114 are in turn respectively connected to a pair of nozzles 115 and 116, the latter of which are adapted to be variably controlled by a baffle 25. The output conduits 117 and 118 may be connected directly to a suitable hydraulic actuator, or to a pilot valve assembly of the type shown in Fig. 2, wherein the signal may be further amplified.

In considering the operation of Fig. 5, it should first be noted that the input supply conduit 111 will have supplied thereto a hydraulic fluid under pressure which will tend, in the absence of some unbalance, to flow equally through the nozzles 113 and 114 to the respective nozzles 115 and 116. If the baffle 25 is deflected toward one or the other of the nozzles 115 and 116, there will be an immediate tendency for the nozzle pressure in the nozzle adjacent the baffle to increase while the opposing nozzle back pressure will decrease. These pressure changes will be reflected to the nozzles 113 and 114 so that the resilient baffle 112 will accordingly be deflected so as to follow the unbalance created by the movement of the baffle 25. Thus, if the baffle 25 moves adjacent the nozzle 115, the back pressure of the nozzle 115 will increase while the back pressure of the nozzle 116 will decrease. This will result in the deflection of the resilient baffle 112 so that it moves toward the nozzle 114 and away from the nozzle 113. This will result in an increased rate of change in the pressure in the output conduits 117 and 118 so that the pressure difference between the two will increase to a greater extent. Conversely, if the baffle 25 should be moved adjacent the nozzle 116, the back pressure of the nozzle 116 will increase while the back pressure of the nozzle 115 will decrease. These pressure changes will be reflected through the nozzles 113 and 114 so that the resilient baffle 112 will be moved toward the nozzle 113 and away from the nozzle 114. This will likewise have the effect of causing the pressures in the conduits 117 and 118 to change at a rate greater than would normally be expected and the amplitude of the difference between the pressures in conduit 118 and conduit 117 will further increase.

In other words the way in which this device operates is this. Fluid at the supply pressure is applied through pipe 111 to the chamber within case 110 and is therefore applied to both sides of the flapper 112. However, flapper 112 is so close to nozzles 113 and 114 that, when the flapper 112 approaches closer to nozzle 113 or 114 than it is to nozzle 114 or 113, the velocity of the fluid between the flapper 112 and the end of the nozzle causes a suction effect and thereby closes nozzle 113 or 114 whichever the flapper 112 is closest to. While it is true that the supply pressure is on both sides of the flapper 112, the action of the flapper 25 including the nozzle 115 or 116 causes a difference in pressure to be applied through nozzles 113 and 114 in flapper 112 and causes the flapper 112 to approach that nozzle in which the pressure is the lowest. This is believed to be due to Bernoulli's Theorem. This theorem is explained in "Handbook of Engineering Fundamentals" by O. W. Eshbach, first edition, 10th Printing, copyright 1936 by John Wiley & Sons, Inc.

It can thus be seen from the modification of Fig. 5 that this form of the apparatus is adapted for high amplification and high rate of response and tends to further improve the overall operation in a combination of the type shown in Fig. 1.

While, in accordance with the provisions of the statutes, there have been illustrated and described the best forms of the embodiments of the invention known, it will be apparent to those skilled in the art that changes may be made in the form of the apparatus disclosed without departing from the spirit of the invention as set forth in the appended claims and that in certain cases, certain features of the invention may be used to advantage without a corresponding use of other features.

Having now described the invention, what it is desired to secure by Letters Patent is:

1. In a hydraulic actuator, the combination comprising a hydraulic pilot valve member movable within a valve body, said body having hydraulic fluid throttling ports therein, a first fluid pressure chamber in said body and communicating with said valve member so that fluid pressures in said chamber will be effective to displace said valve member in accordance with the pressure in said chamber, a second fluid pressure chamber in said body, a spring fastened at one portion to said body and bearing against said valve member, a spherical member positioned between said second chamber and said spring, and valve member actuating means positioned adjacent said spring to move said valve member to a port closing position upon a failure of fluid pressure in said first chamber.

2. In a hydraulic actuator, the combination comprising a hydraulic pilot valve member movable within a valve body, said body having hydraulic fluid throttling ports therein, a first fluid pressure chamber in said body and communicating with said valve member so that fluid pressures in said chamber will be effective to displace said valve member in accordance with the pressure in said chamber, a second fluid pressure chamber in said body, a spring fastened at one portion to said body and bearing against said valve member, a spherical member positioned between said second chamber and said spring, and valve member actuating means comprising a second spring recessed in one end of said valve member and bearing against said first named spring to move said valve member to a port closing position upon a failure of fluid pressure in said first chamber.

3. In apparatus for positioning by hydraulic means a hydraulic actuator, the combination comprising a cylindrical pilot valve piston, a valve body having a cylindrical bore therethrough into which said piston is adapted to be slidably positioned, a pair of valving ports in said body and adapted to be variably throttled by said valve piston, a spring positioned at one end of said bore and having said valve piston in contact therewith, a first piston pressure control chamber formed in said body and in communication with said piston on the end opposite said spring, a second piston pressure control chamber in said valve body and on the side of said spring opposite said valve piston, and a second spring recessed inside the end of said piston adjacent said first named spring and bearing against said first named spring, said second spring being adapted to force said piston valve to a port closing position upon a loss of fluid pressure in said first chamber.

4. In apparatus for positioning by hydraulic means a hydraulic actuator, the combination comprising a cylindrical pilot valve piston, a valve body having a cylindrical bore therethrough into which said piston is adapted to be slidably positioned, a pair of valving ports in said body and adapted to be variably throttled by said valve piston, a diaphragm spring positioned at one end of said bore and having said valve piston in contact therewith, a first piston pressure control chamber formed in said body and in communication with said piston on the end opposite said diaphragm spring, a second piston pressure control chamber in said valve body and on the side of said diaphragm spring opposite said valve piston, a first fluid nozzle having a restricted inlet connected to said first chamber, a second fluid nozzle having a restricted inlet connected to said second chamber, an actuator carrying a nozzle baffle plate positioned to oppositely vary the back pressures in said nozzles so that said back pressures will act in the respective chambers of said valve body, and a second spring recessed inside the end of said piston adjacent said diaphragm spring and bearing against said diaphragm spring, said second spring being adapted to force said piston valve to a port closing position upon a loss of fluid pressure in said first chamber.

5. Apparatus as defined in claim 4 wherein said actuator comprises a flat baffle plate positioned with respect to said nozzles so that said nozzles impinge on the same side thereof but on opposite sides of the pivotal axis of said baffle.

6. In a hydraulic actuator, a member to be positioned, a source of hydraulic fluid under pressure, a pilot valve having a port regulating member connected to regulate the pressure of hydraulic fluid supplied from said source to said positioned member, an actuating pressure chamber positioned adjacent one end of said regulating member, a first spring on the opposite end of said regulating member acting in opposition to the pressure in said chamber, a second spring on the said opposite end of said regulating member, said second spring effecting movement of said regulating member to a closed port position upon a loss of pressure in said chamber, and a flapper-nozzle means connected to said source of hydraulic fluid and to said chamber to variably regulate the pressure in said chamber.

References Cited in the file of this patent

UNITED STATES PATENTS

| | | |
|---|---|---|
| 1,765,059 | De Leeuw | June 17, 1930 |
| 1,955,154 | Temple | Apr. 17, 1934 |
| 2,340,489 | Pontius | Feb. 1, 1944 |
| 2,573,943 | Ziskal | Nov. 6, 1951 |
| 2,601,867 | Alyea | July 1, 1952 |
| 2,625,136 | Moog | Jan. 13, 1953 |
| 2,641,227 | Jacques | June 6, 1953 |
| 2,688,253 | Markson | Sept. 7, 1954 |
| 2,738,772 | Richter | Mar. 20, 1956 |

FOREIGN PATENTS

| | | |
|---|---|---|
| 1,050,795 | France | Sept. 9, 1953 |
| 687,096 | Germany | Jan. 22, 1944 |
| 445,867 | Great Britain | Apr. 16, 1936 |
| 719,275 | Great Britain | Dec. 1, 1954 |